Figure 1:
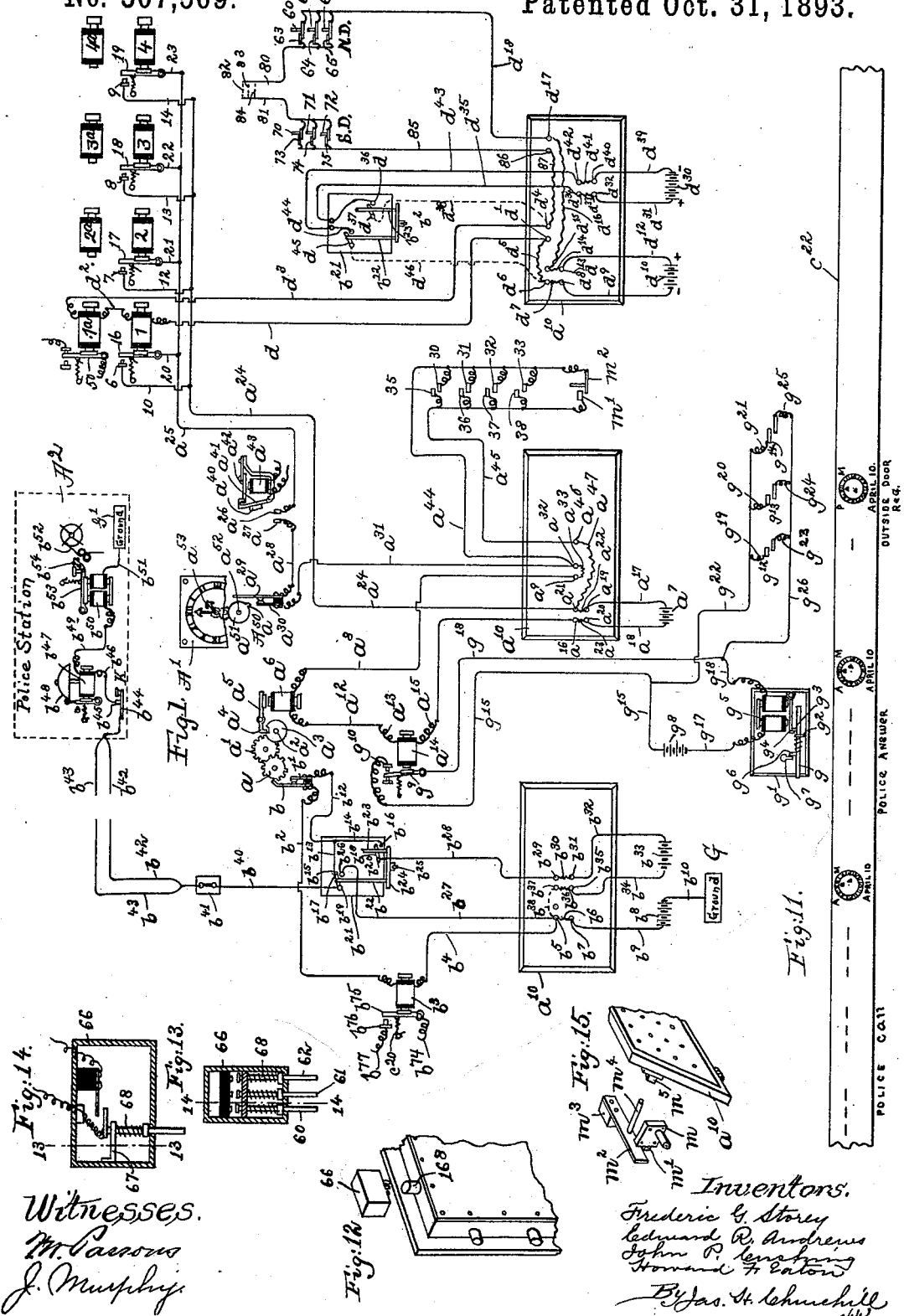

(No Model.) 4 Sheets—Sheet 3.

F. G. STOREY, E. R. ANDREWS, J. P. CUSHING & H. F. EATON.
ELECTRO PROTECTIVE SYSTEM.

No. 507,569. Patented Oct. 31, 1893.

Witnesses.
F. W. Parsons
J. Murphy

Inventors.
Frederic G. Storey
Edward R. Andrews
John P. Cushing
Howard F. Eaton

By Jas. H. Churchill
Atty.

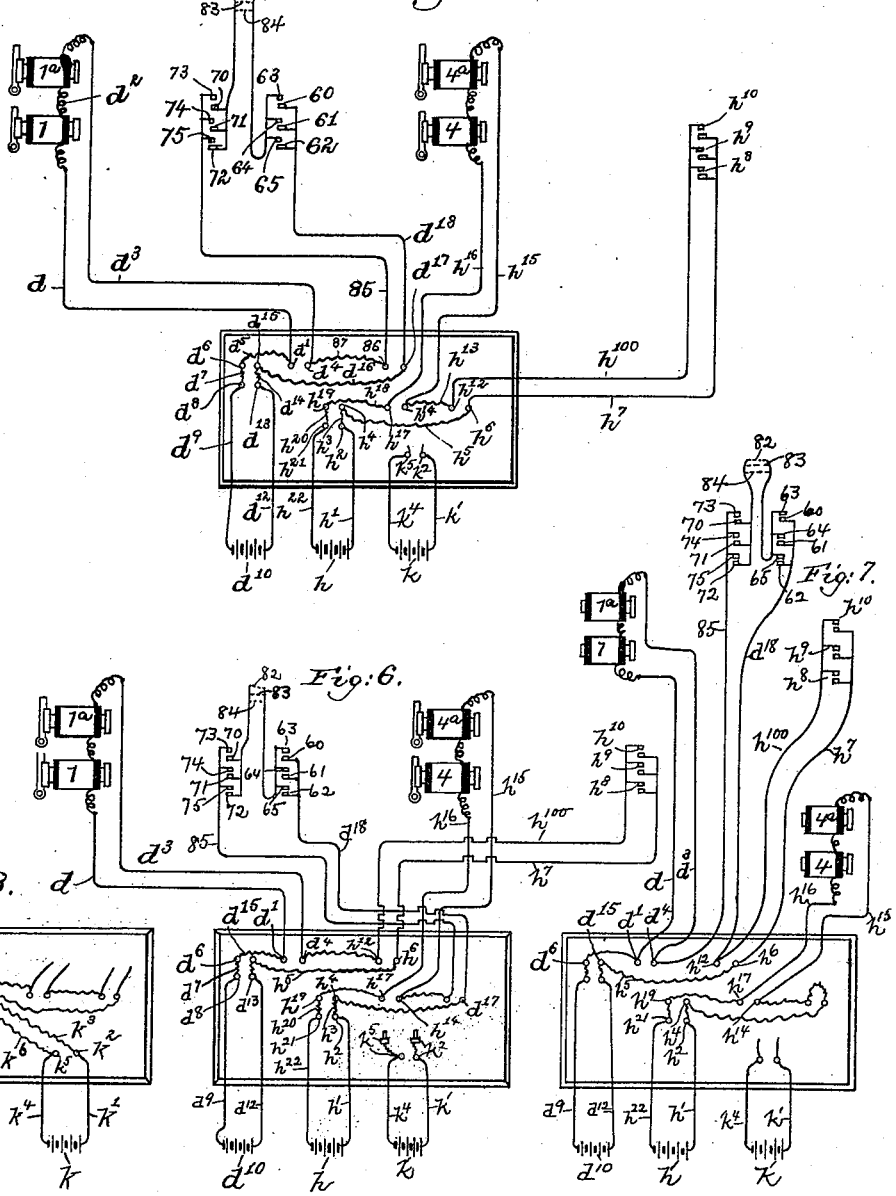

UNITED STATES PATENT OFFICE.

FREDERIC G. STOREY, OF CAMBRIDGE, EDWARD R. ANDREWS AND JOHN P. CUSHING, OF BOSTON, AND HOWARD F. EATON, OF QUINCY, MASSACHUSETTS; SAID EATON AND CUSHING ASSIGNORS TO SAID STOREY AND ANDREWS.

ELECTRO-PROTECTIVE SYSTEM.

SPECIFICATION forming part of Letters Patent No. 507,569, dated October 31, 1893.

Application filed June 24, 1893. Serial No. 478,744. (No model.)

*To all whom it may concern:*

Be it known that we, FREDERIC G. STOREY, residing in Cambridge, in the county of Middlesex, EDWARD R. ANDREWS and JOHN P. CUSHING, residing in Boston, in the county of Suffolk, and HOWARD F. EATON, residing in Quincy, in the county of Norfolk, State of Massachusetts, have invented an Improvement in Electro-Protective Systems, of which the following description, in connection with the accompanying drawings, is a specification, like letters and figures on the drawings representing like parts.

This invention relates to an electrical protective system especially designed and adapted for the protection of safety deposit vaults, banks and like institutions.

One feature of this invention consists in a novel construction and arrangement of electrical apparatus and circuits, whereby the safety deposit or other institution is placed under police protection for a predetermined interval of time, during which time any attempt to open the vaults will be automatically made known and recorded at the police station, and preferably will also be recorded within the vault and in the main or superintendent's office of the institution, the particular building in which the attempt is being made to open the vault being identified in the police station by a number, which will be hereinafter designated as the building number.

Another feature of this invention consists in constructing the apparatus as will be described, so that the building to be protected may be disconnected from the police station, and the plant operated during business hours for purpose of exhibition without sending an alarm to the police station.

This invention further consists in a novel arrangement of test circuits and apparatus operated thereby, by which the condition of the operative circuits may be made known at the time of closing the safety deposit vault or bank, the system being arranged so that each circuit is required to be tested before the circuit to the police station can be completed.

Another feature of the invention consists in a novel arrangement whereby the failure of any circuit to respond to its test is audibly indicated within the building.

This invention further consists in a novel combination of switch board to which all the operative circuits of the system are connected in such manner, that the arrangement or connection of circuits may be transposed or rearranged to prevent illegal tampering with any of the circuits, the combination switch board being constructed so that when once closed, any attempt to open the same by an unauthorized person would be recorded at the police station, which for the purpose of this invention may be regarded as the central office of the system.

Safety deposits, banks and like institutions, as now commonly constructed, have their vaults or receptacles for valuables located in a chamber, which is usually protected by a strong iron grating or grill having a door, which is usually guarded by a policeman.

One of the features of this invention consists in providing the door of the grill or grating with an electrically controlled lock, which is adapted to be automatically operated and locked by an attempt to open a door of any one of the numerous vaults located within the chamber, which closing of the circuit automatically transmits an alarm to the police station. The automatically operated lock is also designed to be operated by manually controlled or operated switches or push buttons distributed about the building. These and other features of this invention will be pointed out in the claims at the end of this specification.

Figure 2:
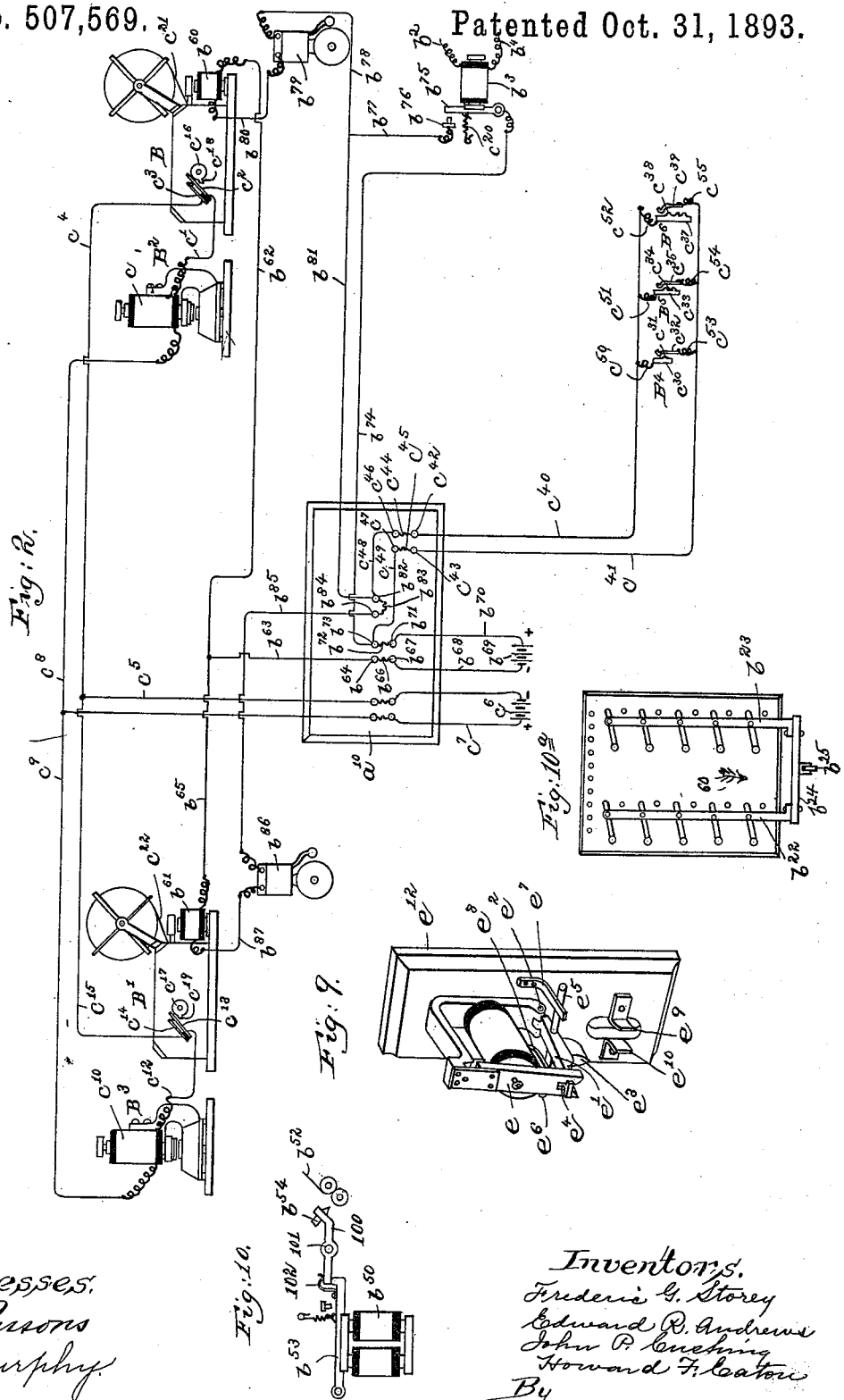
Figure 3:
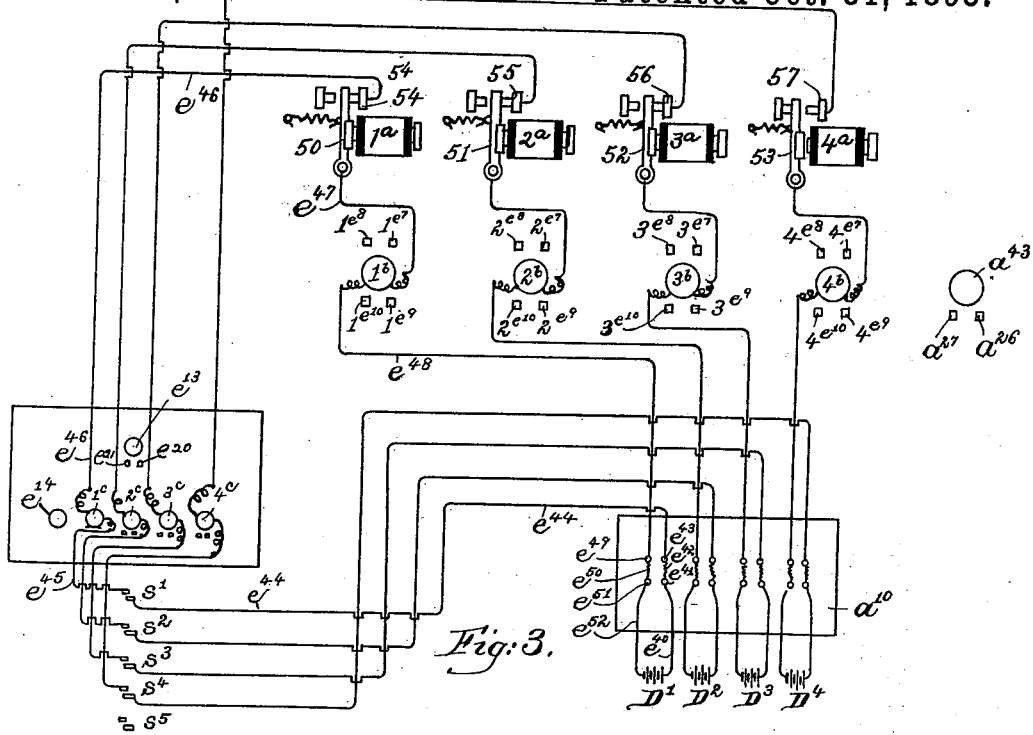
Figure 4:
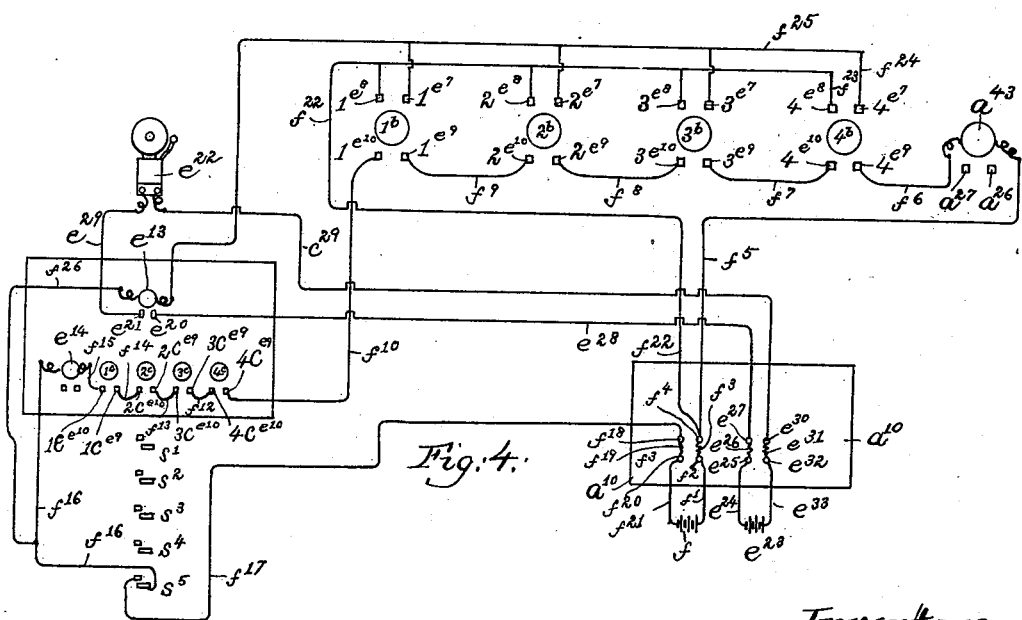

Figure 1 is a diagram of circuits representing the main portion of an electric protective system embodying this invention, the said diagram including the police station and the major part of the system located within the institution to be protected; Fig. 2, a diagram of circuits showing two message recording instruments and two message timing instruments, one set of which is designed to be located within the main vault, and the other set in the superintendent's office; Fig. 3, a diagram of circuits illustrating the test portion of the system; Fig. 4, a diagram of circuits illustrating the circuits controlled by the testing apparatus; Fig. 5, a diagram of circuits illustrating one way of connecting the circuits to the combination switch board; Fig. 6, a diagram of circuits illustrating a different arrangement or combination of the circuits shown in Fig. 5; Fig. 7, a diagram of circuits illustrating another arrangement or combination of the circuits shown in Fig. 5; Fig. 8, a detail to be referred to; Fig. 9, a detail in perspective of the form of test magnet preferred by me; Fig. 10, a detail of the police register to be referred to; Fig. 10$^a$, a detail of switches to be referred to; Fig. 11, a detail of the message recording strip located within the superintendent's office; Fig. 12, a detail showing the manner preferred by us of completing the electric circuit within the vault; Fig. 13, a sectional detail of the circuit terminals operated by the vault door, the section being taken on the line 13—13, Fig. 14; Fig. 14, a sectional detail to be referred to, taken on the line 14—14, Fig. 13, and Fig. 15, a detail of the combination switch board to be referred to.

Referring to Fig. 1, the signal transmitting apparatus by which the signal indicative of the building or institution to be protected is transmitted, is herein shown as an ordinary break-wheel $a$ of any usual or well-known construction, such as now commonly used in electric signal work, the said break-wheel being operated by a motor mechanism, which may be a clock mechanism of any usual or well-known construction, and which in the present instance, is represented by a gear $a'$ connected with a shaft or arbor $a^2$ having upon it a detent disk $a^3$, with which co-operates a finger $a^4$ on the pivoted armature lever $a^5$ of an electro-magnet $a^6$. The magnet $a^6$, which will be hereinafter designated by us as the starting magnet for the signal-transmitting mechanism, is included in the circuit of a battery $a^7$, one end of the coil of the said magnet being preferably connected by wire $a^8$ to a terminal $a^9$ secured to a switch board $a^{10}$, and the other end $a^{12}$ of the coil of the magnet $a^6$ is connected to one end $a^{13}$ of the coil of an electro-magnet $a^{14}$, the purpose of which will be hereinafter described, the other end $a^{15}$ of the coil of the magnet $a^{14}$ being connected to a terminal $a^{16}$ on the switch board $a^{10}$. The battery $a^7$ has its positive and negative poles connected respectively, as herein shown, by wires $a^{17}$ $a^{18}$ to terminals $a^{19}$ $a^{20}$, which are respectively connected to terminals $a^{21}$ $a^{16}$ by removable wires $a^{22}$ $a^{23}$. The terminal $a^{21}$ on the switch board $a^{10}$ is connected to the front stops of, preferably, a series of electro-magnets or relays, in the present instance marked 1, 2, 3, and 4, indicating four circuits as included in the present system.

The front stops referred to, and herein marked 6, 7, 8, and 9, are respectively connected by branch wires 10, 12, 13 and 14 to a wire $a^{24}$, connected to the terminal $a^{21}$ of the switch board $a^{10}$. The armatures of the relays 1 to 4 inclusive, which are marked 16, 17, 18 and 19, are connected by branch wires 20, 21, 22, 23 to a wire $a^{25}$, joined to a contact or terminal $a^{26}$ co-operating with a like terminal $a^{27}$, which latter is joined by wire $a^{28}$ to one member $a^{29}$ of a normally closed time-governed circuit controller A, the co-operating member $a^{30}$ of which is connected by a wire $a^{31}$ to a terminal $a^{32}$ on the switch board, the said terminal $a^{32}$ being joined by wire $a^{33}$ to the terminal $a^9$. The terminals $a^{26}$ $a^{27}$ have co-operating with them a movable member or connecting device, represented as a contact piece or block $a^{40}$ on a pivoted arm $a^{41}$, normally engaged and held elevated by an armature $a^{42}$ of an electro-magnet $a^{43}$, for a purpose as will be described.

The terminal $a^{32}$ on the switch board has connected to it a second wire $a^{44}$ to which are connected the members 30, 31, 32, 33, of normally open circuit controllers or push buttons, the co-operating members 35, 36, 37, 38 of which are connected by the wire $a^{45}$ to a terminal $a^{46}$ on the switch board $a^{10}$, which latter terminal is connected by wire $a^{47}$ to the terminal $a^{21}$.

The normally closed circuit controller A referred to, is designed to remain closed until opened at a predetermined interval of time, which may be selected by the superintendent or other person having charge of the system, and in the present instance, the circuit controller A is represented as being adapted to be opened by a lug or projection $a^{50}$ on a disk $a^{51}$, mounted on a shaft $a^{52}$ adapted to be rotated in unison with the hour hand of a clock mechanism A' of any usual or well-known construction, the disk $a^{51}$ being capable of being set by hand so as to be rotated by the clock mechanism, to bring the lug or projection $a^{50}$ into contact with the member $a^{29}$ of the circuit controller, at a predetermined hour or interval of time at which it is desired to open the circuit of the starting magnet controlled by the relays, thereby permitting the vaults or other receptacles included in circuit with the relays, as will be described, to be opened without giving an alarm at the police station.

Instead of the particular form of circuit controller herein shown, we may employ any other desired or suitable construction capable of acting upon the member $a^{29}$ at the desired interval of time. The signal-transmitting wheel $a$ is designed to operate a circuit leading to the central office or police station A², and preferably to also operate a local circuit within the main vault in which the signal-transmitting mechanism is located, and a second circuit or branch of the local circuit extended to the superintendent's office.

In the present instance, the signal transmitting wheel is shown as adapted to operate one member or pen $b$ of a circuit controller, which co-operates with a second member or pen $b'$. The member $b$ of the circuit controller is connected by wire $b^2$ to one end of the coil of an electro-magnet or relay $b^3$, the other end of the coil of the relay $b^3$ being joined by wire $b^4$ to a terminal $b^5$ on the switch board $a^{10}$, the terminal $b^5$ being connected by a removable wire $b^6$ to a second terminal $b^7$ to which one pole of the battery $b^8$ is joined by wire $b^9$, the other pole of the said battery being connected by wire $b^{10}$ to the ground G. The member $b'$ of the circuit controller operated by the signal-transmitting wheel $a$, is connected by wire $b^{12}$ and its branches $b^{13}$ $b^{14}$ to terminals $b^{15}$ $b^{16}$, with which co-operate respectively the movable members $b^{17}$, $b^{18}$ of switches, which may be of any usual or well-known construction, and which are herein represented as pivoted, as at $b^{19}$, $b^{20}$, to a suitable base or support $b^{21}$, shown separately in Fig. 10$^a$. The switches $b^{17}$ $b^{18}$ are preferably connected together to be moved simultaneously by rods $b^{22}$, $b^{23}$, joined to a cross bar $b^{24}$ provided as herein represented with a roller or projection $b^{25}$, for a purpose as will be described. The switch $b^{17}$ is normally in contact with the terminal $b^{15}$, but when operated, it is adapted to make contact with a terminal $b^{26}$, connected by wire $b^{27}$ to the terminal $b^5$ on the switch board $a^{10}$. The switch $b^{18}$ is joined by wire $b^{28}$ to a terminal $b^{29}$ on the switch board $a^{10}$, which terminal is connected by a wire $b^{30}$ to a terminal $b^{31}$, joined by wire $b^{32}$ to one pole of the battery $b^{33}$, the other pole of which is joined by wire $b^{34}$ to a terminal $b^{35}$, connected by wire $b^{36}$ to a terminal $b^{37}$, joined by wire $b^{38}$ to the terminal $b^5$. The switch $b^{17}$ is connected to the receiving apparatus in the police station $A^2$, the said switch being herein shown as connected by wire $b^{40}$ to a cut-out apparatus $b^{41}$ of any usual or well-known construction, the said cut-out being connected by two wires $b^{42}$ $b^{43}$ to a movable member $b^{44}$ of a key or circuit controller K located in the police station, the stationary member $b^{45}$ of which is connected by wire $b^{46}$, to one end of the coil of the magnet $b^{47}$ of a tap bell $b^{48}$ of any usual or well-known construction, the other end of the coil of the magnet $b^{47}$ being connected by wire $b^{49}$ to one end of the coil of the electro-magnet $b^{50}$, having the other end of its coil connected by wire $b^{51}$ to the ground G$'$. The magnet $b^{50}$ may be the printing magnet of a register or record apparatus of any usual or well-known construction, such as now commonly used in police and fire-alarm systems, to record messages upon the tape $b^{52}$, the armature $b^{53}$ of the said magnet being provided with a stylus or pen $b^{54}$.

In practice, the wires $b^{42}$, $b^{43}$ form a double path for the message between the building to be protected and the police station or central office, so that in case of accident to one of the wires, the signal will still be received over the other wire. In the normal condition of the switches $b^{17}$, $b^{18}$, as represented in Fig. 1, the signal-transmitting apparatus located in a building to be protected, is adapted to transmit its signal to the police station over the ground circuit, and the circuit for this signal may be traced as follows:—from one pole of the battery $b^8$, herein represented as the negative pole, by wire $b^9$, terminal $b^7$, wire $b^6$, terminal $b^5$, wire $b^4$, relay $b^3$, wire $b^2$, to terminal $b$ of the circuit controller co-operating with the break-wheel $a$, terminal $b'$, wire $b^{12}$, branch $b^{13}$, terminal $b^{15}$, switch $b^{17}$, wire $b^{40}$, through the cut-out $b^{41}$, through the double wires $b^{42}$ $b^{43}$ to key K in the police station, thence through the police bell magnet $b^{47}$ and register magnet $b^{50}$ and wire $b^{51}$ to the ground G$'$, thence back to the ground G and by wire $b^{10}$ to the positive pole of the battery $b^8$. The signal transmittted by the signal mechanism or break-wheel $a$, which in the present instance is formed to transmit the number 333, is also received by the relay $b^3$ controlling a local circuit as will be described, including in it preferably two message recording instruments B B$'$ (see Fig. 2) which may be of any usual or well-known form of registering mechanism, such as now commonly used in fire and police signaling work, one of the said registers as B, being located in the main vault, hereinafter designated the steel vault, and the other as B$'$, being located in the superintendent's office. The registering mechanisms B B$'$ are provided with the usual magnets $b^{60}$ $b^{61}$, one end of the coil of the magnet $b^{60}$ being connected by wire $b^{62}$ to a wire $b^{63}$, joined to a terminal $b^{64}$ of the switch board $a^{10}$, the other magnet $b^{61}$ having one end of its coil connected by the wire $b^{65}$ with the wire $b^{63}$. The terminal $b^{64}$ is connected by a removable wire $b^{66}$ to a terminal $b^{67}$, joined by wire $b^{68}$ to one pole, herein shown as the negative pole, of the battery $b^{69}$, the other pole of which is connected by wire $b^{70}$ to a terminal $b^{71}$ on the switch board $a^{10}$, which terminal is joined by a removable wire $b^{72}$ to a terminal $b^{73}$, connected by a wire $b^{74}$ to the armature $b^{75}$ of the relay $b^3$, the said armature co-operating with a back-stop $b^{76}$ joined by wire $b^{77}$ to a wire $b^{78}$, connected to one end of the coil of an operating magnet for the bell $b^{79}$, the other end of the coil of the said bell magnet being joined by wire $b^{80}$ to the magnet $b^{60}$. The wire $b^{77}$ connected to the back-stop $b^{76}$, is also joined by a wire $b^{81}$ to a terminal $b^{82}$ on the switch board $a^{10}$, which terminal is connected by wire $b^{83}$ to a terminal $b^{84}$, joined by wire $b^{85}$ to one end of the coil of the operating magnet, not shown, of a bell $b^{86}$, the other end of the coil of the said magnet being joined by wire $b^{87}$ to the operating magnet $b^{61}$ of the register B$'$. The registers B B$'$ have co-operating with them time stamp mechanisms B$^2$ B$^3$, which may be of any usual or well-known construction and which are operated from the registers. The time stamp mechanism B$^2$ has its electro-magnet $c$ joined by wire $c'$ to one terminal or pen $c^2$ of a normally open circuit controller, the other terminal or pen $c^3$ of which, is connected by wire $c^4$ to a wire $c^5$ leading to one pole of the battery $c^6$, the other pole of which is connected by wire $c^7$ to wires $c^8$ $c^9$, the wire $c^8$ being connected to one end of the coil of the electro-magnet $c$ for the time stamp $B^2$, while the wire $c^9$ is connected to the end of the coil of the electro-magnet $c^{10}$ of the time stamp $B^3$, the other end of the coil of the magnet $c^{10}$ being joined by wire $c^{12}$ to one terminal $c^{13}$ of a normally open circuit controller, the co-operating member $c^{14}$ of which is connected by wire $c^{15}$ to the wire $c^5$. The normally open circuit controllers governing the operation of the time stamps $B^2 B^3$, are adapted to be closed during the movement of the register to record a signal, by suitable devices, herein shown as disks $c^{16} c^{17}$ provided with projections $c^{18} c^{19}$, the said disks being mounted upon suitable shafts of the register so as to be revolved when the register is started.

Each break in the main line circuit occasioned by a tooth or projection on the break-wheel $a$, demagnetizes the relay $b^3$, and its armature $b^{75}$ is withdrawn by its retractor $c^{20}$ into engagement with the back-stop $b^{76}$, thereby closing the circuits of the magnets $b^{60} b^{61}$ for the registers, and causing a record to be made upon the tapes $c^{21} c^{22}$ after the manner now commonly practiced in police and fire alarm systems. The circuit for the starting magnet $b^{60}$ of the register B may be traced as follows:—from the positive pole of the battery $b^{69}$ by wire $b^{70}$, terminal $b^{71}$, removable wire $b^{72}$, terminal $b^{73}$, wire $b^{74}$ to the armature $b^{75}$, thence by the back-stop $b^{76}$, wires $b^{77}, b^{78}$ through the magnet of the bell $b^{79}$, thence by wire $b^{80}$ through the magnet $b^{60}$, thence by wires $b^{62}, b^{63}$ to the terminal $b^{64}$, through the wire $b^{66}$, terminal $b^{67}$ and wire $b^{68}$, to the negative pole of the battery.

The circuit for the starting magnet $b^{61}$ of the register B′ may be traced as follows:— from the positive pole of the battery $b^{69}$ to the armature $b^{75}$ as above described, thence by the back-stop $b^{76}$, wires $b^{77}, b^{81}$ to the terminal $b^{82}$, thence by the wire $b^{83}$, terminal $b^{84}$, wire $b^{85}$, through the magnet of the bell $b^{86}$, wire $b^{87}$, magnet $b^{61}$ and wires $b^{65}, b^{63}$ to the terminal $b^{64}$, thence to the negative pole of the battery through the wire $b^{66}$, terminal $b^{67}$ and wire $b^{68}$. It will thus be seen that at each opening of the circuit containing the relay $b^3$, occasioned by a tooth or projection of the signal transmitting mechanism or break-wheel $a$, the magnets of the registers $b^{60} b^{61}$ are energized, and a record of each impulse or break is denoted upon the recording tapes $c^{21} c^{22}$ after the manner illustrated in Fig. 11 on the tape $c^{22}$, each break being indicated by a substantially short mark or dash.

The time stamps $B^2 B^3$ are operated by the starting of the register to record the time at which the signal indicated by the break-wheel $a$, is received. In order that a record may be made of the opening of the doors of the building or bank after the latter has been closed to its depositors and the protective system set in operation as will be described, the different doors of the building are provided with circuit controllers connected in circuit with the operating magnets of the registers B B′, and in order to identify the particular door, which has been opened, we prefer to construct the circuit controllers of the different doors in such manner as to identify or designate the particular door opened. This may be accomplished after the manner shown in Fig. 2, wherein are represented three circuit controllers $B^4 B^5 B^6$, the circuit controller $B^4$ consisting of the member $c^{30}$ provided with a single projection $c^{31}$ adapted to co-operate and make contact with a pen or member $c^{32}$, when the door is opened. The circuit controller $B^5$ consists of a similar member $c^{33}$ provided with two projections $c^{34}$ co-operating with a pen $c^{35}$, and the circuit controller $B^6$ is represented as consisting of the member $c^{37}$ provided with three projections $c^{38}$, which co-operate with the contact pen or member $c^{39}$. One member of each of these circuit controllers is attached to or connected with a door, and the other member may be attached to the casing of the door, so that when the door is opened contact will be made between the contact pen or spring and the tooth or projection on its co-operating member.

The circuit controllers $B^4 B^5 B^6$ are connected in circuit with the battery $b^{69}$ and with the magnets $b^{60} b^{61}$ of the registers by the wires $c^{40} c^{41}$, connected respectively to terminals $c^{42} c^{43}$ on the switch board $a^{10}$, the circuit terminals being joined by removable wires $c^{44} c^{45}$ to terminals $c^{46} c^{47}$, connected respectively by wires $c^{48} c^{49}$ to the terminals $b^{82} b^{73}$. The members $c^{30} c^{33} c^{37}$ of the circuit controllers $B^4 B^5 B^6$ are connected as herein shown to the wire $c^{40}$, by the wires $c^{50} c^{51} c^{52}$, while their co-operating members $c^{32} c^{35} c^{39}$ are connected by wires $c^{53} c^{54} c^{55}$ to the wire $c^{41}$. In order that the operation of the registers by the opening of any one of the doors may be understood, we will describe the circuit completed by the opening of the door provided with the circuit controller $B^4$. When the door is opened, the contact pen $c^{32}$ and the tooth or projection $c^{31}$ are brought into engagement, and the circuit from this door may be traced from the positive pole of the battery $b^{69}$ by wire $b^{70}$, removable wire $b^{72}$ to the terminal $b^{73}$, thence by the wire $c^{49}$, terminal $c^{47}$, removable wire $c^{45}$, terminal $c^{43}$, wires $c^{41}, c^{53}$, contact pen $c^{32}$, contact member $c^{30}$, wires $c^{50}, c^{40}$, to terminal $c^{42}$, thence by removable wire $c^{44}$, terminal $c^{46}$, wire $c^{48}$ to a terminal $b^{82}$, where the current divides, part going through the wire $b^{81}$, the bell $b^{79}$, wire $b^{80}$, register magnet $b^{60}$, wires $b^{62}$ and $b^{63}$ to the negative pole of the battery $b^{69}$; the other portion of the current leaving the terminal $b^{82}$ passing through the wire $b^{83}$, terminal $b^{84}$, wire $b^{85}$, bell $b^{86}$, wire $b^{87}$, magnet $b^{61}$ of the register B′, wires $b^{65}, b^{63}$ to the negative pole of the battery. It will thus be seen that by opening the door provided with the circuit controller $B^4$, the magnets $b^{60} b^{61}$ are energized and the registers B B′ operated and made to record one short mark or dash on the tapes $c^{21} c^{22}$, and at the same time, the time stamp mechanisms $B^2 B^3$ are operated to record the time at which the door is opened. The short mark on the tapes $c^{21}$ $c^{22}$ denotes that the door provided with the circuit controller $B^4$ has been opened. If the door provided with the circuit controller $B^5$ is opened, two marks or dashes are recorded upon the tapes of the registers, and will thereby denote that the door provided with the circuit controller $B^5$ has been opened, and if the door provided with the circuit controller $B^6$ is opened, three marks will be recorded upon the tapes of the registers.

It is evident that each door of the bank or vault, if so desired, may be provided with a circuit controller constructed to identify the door by which it is operated. It will be noticed that the opening operates only the registers and time stamps in the vault and in the superintendent's office, and does not operate the police signal recording mechanism. In this manner an accurate record of the opening of the different doors of the institution after the latter has been closed and placed under police protection, is obtained, and in accordance with this invention, a record of the cause or reason for opening any of the bank doors after hours, will be entered upon a suitable record book kept for that purpose, thereby enabling the superintendent or other proper officer to know the number of times each door has been opened during his absence, and the purpose for which it was opened.

In accordance with this invention, one or more of the different safes containing the valuables to be protected are included in separate circuits, each of which is provided with a main or signal operating relay connected to a test relay. In Fig. 1, we have shown one complete circuit for the relays 1 $1^a$, which circuit includes one vault, which, for instance, may be supposed to be the silver vault represented as provided with two doors marked "N D, S D," signifying respectively north and south doors of the said vault. The relays 1 $1^a$ are connected in series as herein shown, and one end of the coil of the relay 1 is connected by wire $d$ to a terminal $d'$ on the switch board $a^{10}$, and the other end of the coil of the relay 1 is connected to one end of the coil of the relay $1^a$ by wire $d^2$, the other end of the coil of the relay $1^a$ being connected by wire $d^3$ to a terminal $d^4$. The terminal $d'$ is joined by wire $d^5$ to a terminal $d^6$, connected by a wire $d^7$ to a terminal $d^8$, joined by wire $d^9$ to one pole of a battery $d^{10}$, the other pole of which is connected by wire $d^{12}$ to a terminal $d^{13}$, joined by wire $d^{14}$ to a terminal $d^{15}$, which is represented in Fig. 1, as connected by wire $d^{16}$ to a terminal $d^{17}$ electrically connected by wire $d^{18}$ to the north door, as will be described. The north door is provided with, preferably, three circuit controllers consisting of three movable members or rods 60, 61, 62, and three stationary members 63, 64, 65, which in practice are located in a suitable box or case 66 shown in detail in Figs. 12, 13 and 14. The members or rods 60, 61, 62 are shown in Fig. 14, as movable in a guide arm 67 and as encircled by springs 68, which serve to remove or withdraw the members 60, 61, 62, from engagement with the members 63, 64, 65, when the bolt 168 (see Fig. 12) is withdrawn. The south door of the silver vault is equipped with like circuit controllers, consisting of the movable members 70, 71, 72, and the stationary members 73, 74, 75. We prefer to employ three sets of circuit controllers for each vault door and to arrange the same in multiple as shown in Fig. 1, to thereby guard against imperfect contact between the members, thereby insuring a closing of the relay circuit when the vault door is closed and locked. As represented in Fig. 1, the numbers 63, 64, 65 on the north door are connected to a wire 80, and the members 70, 71, 72, are connected to a wire 81, which, as shown, is joined to the wire 80 by three wires 82, 83, 84, which in practice, are located under the sidewalk and beneath the usual grating in said sidewalk. Instead of three wires, we may use only one, but we prefer to employ more than one, to avoid the circuit being opened, if one of the said wires should become accidentally broken. The numbers 73, 74, 75 of the south door controllers are connected to a wire 85 leading to a terminal 86 on the switch board $a^{10}$, the said terminal being joined by a removable wire 87 to the terminal $d^4$.

As represented in Fig. 1, the doors N. D. S. D. of the silver vault are closed, and the circuit of the relays 1, $1^a$ completed, which circuit may be traced as follows, viz:—from the positive pole of the battery $d^{10}$ by wire $d^{12}$, terminal $d^{13}$, wire $d^{14}$, terminal $d^{15}$, wire $d^{16}$, terminal $d^{17}$, wire $d^{18}$, circuit controllers 60 to 65 inclusive, wire 80, wires 82, 83, 84, wire 81, controllers 70 to 75 inclusive, wire 85, terminal 86, wire 87, terminal $d^4$, wire $d^3$, relays $1^a$, 1, wire $d$, terminal $d'$, wire $d^5$, terminal $d^6$, wire $d^7$, terminal $d^8$, and wire $d^9$ to the negative pole of the battery.

In order that the circuit of the relays 1, $1^a$, may be completed for purpose of exhibiting the system when the doors N. D., S. D., of the silver vault are opened during the day-time, an auxiliary battery $d^{30}$ is adapted to be included in circuit with the relays 1, $1^a$, to energize the said relays, and thereby open the circuit of the signal transmitting mechanism between the armature 16 of the relay 1 and its back-stop 6. As shown in Fig. 1, the battery $d^{30}$ has one pole, as for instance, the positive pole, connected by wire $d^{31}$ to a terminal $d^{32}$ on the switch board $a^{10}$, which terminal is joined by a wire $d^{33}$ to a terminal $d^{34}$, connected by wire $d^{35}$ to a terminal $d^{36}$ on the switch board $b^{21}$, the said terminal having cooperating with it a movable member or switch $d^{37}$ secured to the rod $b^{23}$, the said movable member being joined by wire $d^{38}$ to the terminal $d^4$. The negative pole of the battery $d^{30}$ is connected by wire $d^{39}$ to a terminal $d^{40}$ on the switch board $a^{10}$, which terminal is joined by a wire $d^{41}$ to a terminal $d^{42}$, connected by wire $d^{43}$ to a terminal $d^{44}$ on the switch board $b^{21}$, the terminal $d^{44}$ having co-operating with it a movable member or switch $d^{45}$ secured to the rod or bar $b^{22}$, and joined by wire $d^{46}$ to the terminal $d^6$. The relays 1, $1^a$ are normally included in circuit with the doors of the silver vault when the latter are closed and locked, but when the vault doors are open, the relays 1, $1^a$, become demagnetized until the switches $d^{37}$, $d^{45}$, are brought into engagement with their co-operating terminals $d^{36}$, $d^{44}$. With the switches $d^{37}$, $d^{45}$ in contact with their co-operating terminals $d^{36}$, $d^{44}$, the circuit of the relays 1, $1^a$, may be traced as follows, viz:—from the positive pole of the battery $d^{30}$ by wire $d^{31}$, terminal $d^{32}$, wire $d^{33}$, terminal $d^{34}$, wire $d^{35}$ to terminal $d^{36}$, thence by switch $d^{37}$, wire $d^{38}$, terminal $d^4$, wire $d^3$, relay $1^a$, wire $d^2$, relay 1, wire $d$, to terminal $d'$, thence by wire $d^5$, terminal $d^6$, wire $d^{46}$, switch $d^{45}$, terminal $d^{44}$, wire $d^{43}$, terminal $d^{42}$, wire $d^{41}$, terminal $d^{40}$, and wire $d^{39}$ to the negative pole of the battery $d^{30}$. It will thus be seen that the relays 1 $1^a$ may be magnetized and demagnetized when the vault doors are opened, by closing and opening the switches $d^{37}$, $d^{45}$, the test relays $1^a$, $2^a$, &c., governing the operative condition of the signal transmitting circuit as will be described.

Referring to Fig. 3, the relays $1^a$ to $4^a$ inclusive, directly govern four test circuits provided with circuit controllers or push buttons, numbered 1 to 4 to correspond to the test circuits and which may be used in the present instance to identify the different test circuits. It will be noticed by reference to Figs. 1 and 3, that the test circuits 1 to 4 are governed by the test relays $1^a$ to $4^a$, and that those relays are included in the four circuits governed by the doors of the vaults or receptacles to be protected, so that, if the test circuits are in working condition when the vaults are closed, the circuits including the vaults are also in working condition.

One feature of this present system is to enable the vault circuits to be tested after the vault doors are closed, without operating the signal transmitting mechanism, and to render it obligatory upon the person making the test of the vault circuits, to test all the circuits before the system can be turned over or connected in circuit with the police station or central office. To accomplish this result, the test circuits include the armatures 50, 51, 52, 53, of the relays $1^a$ to $4^a$ inclusive, and also the front stops 54, 55, 56, 57 for said armatures. The test circuits further include one set of electro-magnets $1^b$ $2^b$ $3^b$ $4^b$, and a second set of electro-magnets $1^c$, $2^c$, $3^c$, $4^c$, for a purpose as will be described.

The electro-magnets $1^b$ to $4^b$ inclusive may and preferably will be made substantially as shown in Fig. 9, each magnet being provided with an armature $e$, governing the action of a circuit controller shown as a bar $e'$ of conducting material, pivoted as at $e^2$ and provided with a substantially wedge-shaped piece $e^3$, and having its free end notched to enter into a slot $e^4$ in the end of the armature $e$, the said bar being held up by the said armature in an old and patented form, but instead of the particular construction shown, we may use any other suitable construction. The bar $e'$ as represented in Fig. 9, has extended from its opposite sides conducting rods $e^5$ $e^6$, which, in the normal or elevated position of the said bar, co-operate with circuit terminals $e^7$ $e^8$, and the wedge $e^3$ when the bar $e'$ is released by the attraction of the armature $e$, co-operates with terminals $e^9$ $e^{10}$, the said terminals being secured as shown in Fig. 9 to a suitable base $e^{12}$. For the sake of clearness, we have, in Figs. 3 and 4, identified the circuit terminals $e^7$ $e^8$ $e^9$ $e^{10}$ employed with the different test magnets, by prefixing the number of the test circuit in which its magnet is located. The circuit terminals $e^7$ $e^8$ corresponding to the different test circuits, are arranged in multiple with one another in a circuit including an electro-magnet $e^{13}$, which will be hereinafter specified as the "out of order" magnet, while the terminals $e^9$ $e^{10}$ corresponding to the different test circuits, are arranged in series in a circuit including a magnet $e^{14}$, to be hereinafter designated as the "in order" magnet, and also including the signal-transmitting circuit-controlling magnet $a^{43}$.

The magnets $1^c$ to $4^c$ inclusive, together with the magnets $e^{13}$ $e^{14}$, in practice, are located in a suitable case, not shown, but which is preferably located in the vault room or chamber, while the magnets $1^b$ to $4^b$ inclusive and the magnet $a^{43}$ are located in the main vault, which may be designated as the steel vault. The magnets $1^c$ to $4^c$ are provided with armatures having co-operating with them circuit controlling drops or bars, which may be of the same construction as the test magnet drops shown in Fig. 9, except that the pins or rods $e^5$ $e^6$ and circuit terminals $e^7$ $e^8$ are omitted. The circuit controlling wedges $e^3$ operated by the magnets $1^c$ to $4^c$ inclusive co-operate with terminals $e^9$ $e^{10}$, which may be distinguished from each other and from the terminals governed by the test magnets $1^b$ to $4^b$, by prefixing the symbol of the magnet $1^c$ to $4^c$ inclusive, which governs the said terminals, as clearly shown in Fig. 4. The circuit controlling wedge $e^3$ operated by the "out of order" magnet $e^{13}$ co-operates with circuit terminals $e^{20}$ $e^{21}$ of a local circuit including an audible signal or bell $e^{22}$, preferably of the vibratory or continuous ringing type, by which a warning is given that the circuits are not in order, the said local circuit including a battery $e^{23}$, herein shown as connected to the switch board $a^{10}$, one pole of the battery $e^{23}$ being connected by wire $e^{24}$ to a terminal $e^{25}$ on the switch board $a^{10}$, the said terminal being joined by wire $e^{26}$ to a terminal $e^{27}$, connected by wire $e^{28}$ to the circuit terminal $e^{20}$, the terminal $e^{21}$ being connected by wire $e^{29}$, including the magnet of the bell $e^{22}$, to a terminal $e^{30}$ on the switch board $a^{10}$, the terminal $e^{30}$ being joined by wire $e^{31}$ to a terminal $e^{32}$ connected by wire $e^{33}$ to the negative pole of the battery $e^{23}$.

As represented in Fig. 3, each test circuit is provided with its own battery marked $D'$ $D^2$ $D^3$ $D^4$, connected to the switch board $a^{10}$, and the circuit of the said batteries is governed at two points, namely, at the push buttons or controllers $s'$ to $s^4$ inclusive, and at the armatures 50 to 53 inclusive. Inasmuch, as the circuit connections of the four test circuits are the same, we will describe but one in detail, namely, test circuit No. 1. The battery $D'$ has one of its poles, shown as the positive pole, connected by wire $e^{40}$ to a terminal $e^{41}$ on the switch board $a^{10}$, which terminal is joined by wire $e^{42}$ to a terminal $e^{43}$ connected by wire $e^{44}$, to one member of the switch or push button $s'$, the other member of which is joined by wire $e^{45}$ to one end of the coil of the magnet $1^c$, the other end of the said coil being connected by wire $e^{46}$ to the front stop 54, with which co-operates the armature 50 connected by wire $e^{47}$ to one end of the coil of the magnet $1^b$, the other end of the said magnet being connected by wire $e^{48}$ to a terminal $e^{49}$ on the switch board $a^{10}$, the terminal $e^{49}$ being joined by wire $e^{50}$ to a terminal $e^{51}$, connected by wire $e^{52}$ to the negative pole of the battery $D'$. It will thus be seen, that as long as the circuit of the test relay $1^a$ is closed, the armature 50 will be attracted and will make contact with its front stop 54, and the circuit of the magnets $1^b$ and $1^c$, will be closed at that point but will remain open at the push button or switch $s'$. When it is desired to test the circuit of the relay $1^a$, the push button or switch $s'$ is closed by the operator, and if the circuit of the test relay $1^a$ is closed and in operative condition, the circuit of the battery $D'$ will be completed, and the magnets $1^b$ $1^c$ energized, but if the circuit of the test relay $1^a$ is defective, such as by a break in a circuit wire or by a weakening of the battery, the circuit of the battery $D'$ will not be completed when the switch or push button $s'$ is closed.

The circuit of the battery $D'$ may be traced as follows: from the positive pole by wire $e^{40}$, terminal $e^{41}$, wire $e^{42}$, terminal $e^{43}$, wire $e^{44}$, switch button $s'$, wire $e^{45}$, magnet $1^c$, wire $e^{46}$ to the front stop 54, thence by the armature 50, wire $e^{47}$, magnet $1^b$, wire $e^{48}$, terminal $e^{49}$, wire $e^{50}$, terminal $e^{51}$ and wire $e^{52}$ to the negative pole of the battery.

The circuits of the batteries $D^2$, $D^3$, $D^4$, are tested by closing the push buttons or switches $s^2$, $s^3$, $s^4$ in the same manner, and as each circuit is closed at its push button, the armatures $e$ of the drop magnets $1^b$, $2^b$, $3^b$, $4^b$, are attracted, and the circuit controlling bars $e'$ co-operating with the said armatures are released, the wedges $e^3$ on the said bars dropping into engagement with the circuit terminals $e^9$, $e^{10}$ of the respective test circuits. At the same time, the armatures $e$ of the annunciator magnets $1^c$, $2^c$, $3^c$, $4^c$, which are secured to the test board, are also attracted, and release the circuit controlling bars $e'$ co-operating therewith, which bars fall and their wedges make contact with the circuit terminals $c$ $e^9$ $c$ $e^{10}$, if all the test circuits are in working condition, and the circuit of the magnet $a^{43}$ and of the "in order" magnet $e^{14}$ will thus be completed at all points except at the push button or switch $s^5$, so that, when the operator closes the switch or push button $s^5$, the armature of the "in order" magnet $e^{14}$, preferably inscribed with the words "In order," will visually indicate that all the test circuits are in working condition, and at the same time the armature of the magnet $a^{43}$ will drop and make contact with the circuit terminals $a^{26}$, $a^{27}$, thereby completing the circuit of the starting magnet $a^6$ for the signal transmitting mechanism at all points except between the armatures of the relays 1 to 4 inclusive and their back stops 6 to 9 inclusive, as represented in Fig. 1; so that if a relay in any of the circuits, as for instance, the relay 1, should become demagnetized by the opening of its circuit, its armature will be brought into contact with its back stop, and thereby complete the circuit of the starting magnet $a^6$, which, in turn, attracts its armature $a^5$ and starts the signal-transmitting mechanism in operation and transmits the number indicated by the teeth or projections on the break-wheel $a$, to the police station, and also to the superintendent's office and back to the receiving instrument in the main or steel vault.

The circuit of the magnet $a^{43}$ shown in Fig. 4 includes in it a battery $f$ having one of its poles, as for instance, the positive pole, connected by wire $f'$ to a terminal $f^2$ on the switch board $a^{10}$, which terminal is joined by a wire $f^3$ to a terminal $f^4$, connected by wire $f^5$ to one end of the coil of the magnet $a^{43}$, the other end of the coil of the said magnet being joined by wire $f^6$ to the circuit terminal 4 $e^9$ connected by the wedge $e^3$ on the circuit controlling bar of the magnet $4^b$ to the terminal 4 $e^{10}$, which is joined by wire $f^7$ to the terminal 3 $e^9$, electrically connected through its co-operating wedge $e^3$ with the terminal 3 $e^{10}$, joined by wire $f^8$ to the terminal 2 $e^9$, electrically connected through its co-operating wedge $e^3$ with the terminal 2 $e^{10}$, which is joined by wire $f^9$ to the terminal 1 $e^9$, electrically connected through its wedge $e^3$ to the terminal 1 $e^{10}$, thence by wire $f^{10}$ to the terminal $4^c$ $e^9$, through its wedge to the terminal $4^c$ $e^{10}$, thence by wire $f^{12}$ to the terminal $3^c$ $e^9$, through its connecting wedge to the terminal $3^c$ $e^{10}$, thence by wire $f^{13}$ and the terminal $2^c$ $e^9$ and its wedge $e^3$ to the terminal $2^c$ $e^{10}$, thence by wire $f^{14}$ to the terminal $1^c$ $e^9$, through its connecting wedge to the terminal $1^c$ $e^{10}$, thence by wire $f^{15}$ through the electro-magnet $e^{14}$, thence by wire $f^{16}$ to one member of the switch $s^5$, thence through the other member of the switch by wire $f^{17}$ to the terminal $f^{18}$ on the switch board $a^{10}$, thence by the wire $f^{19}$, terminal $f^{20}$, and wire $f^{21}$ to the negative pole of the battery $f$. It will thus be seen that the circuit terminals controlled by the electro-magnets $1^c$ to $4^c$ inclusive, and by the electro-magnets $1^b$ to $4^b$ inclusive, are arranged in series in the circuit of the magnet $a^{43}$, and if for any reason, any one of the circuits connected to the vaults or receptacles to be guarded, which circuits include the relays 1 to 4 inclusive and the test relays $1^a$ to $4^a$ inclusive, should be out of order, as by the breaking of a connection or by the weakening of its battery, the armature of the test relay included in the particular circuit so disabled, would be retracted away from its front stop and thereby open the test circuit corresponding to the particular circuit thus disabled.

Referring to Fig. 3, we have shown the armature $b^{53}$ of the test relay $4^a$ as withdrawn from engagement with its front stop 57, thereby indicating that the circuit in which the test relay $4^a$ and the relay 4 are included, is out of order. When one of the circuits including the relays 1 to 4 and $1^a$ to $4^a$ inclusive, is out of order, which, in the present instance, is indicated as the circuit including the test relay $4^a$, the magnets $4^c$ and $4^b$ will not be energized when the operator closes the fourth test circuit at the push button or switch $s^4$; and in this case, the circuit controlling bar $e'$ operated by the magnet $4^b$ will remain in its normal position, with the pins $e^5$ $e^6$ in engagement with the circuit terminals 4 $e^7$ 4 $e^8$, so that, when the operator closes the switch or push button $s^5$, the circuit of the "out of order" magnet $e^{13}$ will be completed through the said terminals, and the "in order" magnet will not be energized, nor will the magnet $a^{43}$ be energized to complete the circuit of the starting magnet $a^6$. The circuit of the "out of order" magnet $e^{13}$ in this case may be traced as follows:—from the positive pole of the battery $f$ by wire $f'$, terminal $f^2$, wire $f^3$, terminal $f^4$, wire $f^{22}$, and branch wire $f^{23}$, terminal 4 $e^8$, pins $e^6$, $e^5$, terminal 4 $e^7$, branch wire $f^{24}$, wire $f^{25}$, connected to one end of the coil of the magnet $e^{13}$, thence by wire $f^{26}$ connected to the wire $f^{16}$, thence by wire $f^{16}$ through the switch $s^5$ and wire $f^{17}$ to the terminal $f^{18}$, thence by the wire $f^{19}$, terminal $f^{20}$, and wire $f^{21}$, to the negative pole of the battery $f$. The magnet $e^{13}$ being energized, attracts its armature and releases its circuit controlling bar $e'$, the wedge $e^3$ of which is brought into engagement with the terminals $e^{20}$, $e^{21}$, of the local circuit containing the battery $e^{23}$ and the magnet of the bell $e^{22}$. This local circuit is therefore closed by the energizing of the magnet $e^{13}$, and remains closed until positively opened by lifting the circuit controlling bar $e'$ of the said magnet. In this way, an audible alarm is given that one of the circuits is out of order, and the particular circuit is identified by the drop of the magnet on the test board remaining in its normal position, which drop, in the present instance, would be the drop of the magnet $4^c$. We prefer to employ a vibrating or continuous ringing bell, which will ring as long as the local circuit is closed, as by this means the attention of the operator is imperatively called to the "out of order" condition of the circuits. In practice, the magnets $1^c$ to $4^c$ inclusive and the magnets $e^{13}$ $e^{14}$, together with the push buttons $s'$ to $s^5$ inclusive, are preferably mounted upon a board inclosed within a case, which we prefer to designate as the test case, while the relays 1 to 4 and $1^a$ to $4^a$ inclusive, the electro-magnets $1^b$ to $4^b$ inclusive, the magnet $a^{43}$, the time operated circuit controller A, the signal transmitting mechanism, the relay $b^3$ and the magnets $a^6$ to $a^{14}$, we prefer to locate within one of the large vaults, preferably the main or steel vault, within a suitable cabinet, and for the best disposition we prefer to arrange the signal transmitting mechanism, its starting magnet, the relay $a^{14}$ and the gang switch, within a separate case provided with a door, which, when closed, acts upon the roller $b^{25}$ of the cross bar $b^{24}$ forming part of the gang switch, and moves the switches into their full line position shown in Fig. $10^a$, but which door when opened permits the switches to be automatically moved in the direction indicated by arrow 60 to complete their circuits for exhibition purposes. Within the second cabinet, we prefer also to locate the register B and the time stamp $B^2$.

In security vaults as now commonly constructed, the different vaults are usually located in a chamber provided with what is technically known as an "iron grill" having a door constantly guarded by a watchman. One feature of this present invention consists in providing a door of the grill with an electrically actuated lock, in addition to the usual manually operated lock, which electrically actuated lock is represented in Fig. 1 as a bolt $g$, located within a suitable casing or framework $g'$, and sliding in bearings in one side of the casing and in the standard $g^2$, and provided with a lug or projection $g^3$, which is normally engaged by the hooked end of an armature $g^4$ of an electro-magnet $g^5$, also located within the case $g'$. The bolt $g$, as herein shown, is provided with a second lug $g^6$ between which and the upright $g^2$, the said bolt is encircled by a spiral spring $g^6$, which acts to throw the bolt out of the case and into a suitable socket in the door, when the electro-magnet $g^5$ is energized and the door is in its normal position. The case $g'$ is provided with a keyhole $g^7$, through which which a key may be inserted to return the bolt to its normal position. This key will be kept in the possession of the superintendent or other authorized person.

The purpose of the electrically controlled lock for the door of the grill is, to afford a double security both at night-time when the bank or vault is closed, and also during the day-time, and to effect this result, the electro-magnet $g^5$ controlling the operation of the bolt is connected in a local circuit provided with a local battery $g^8$, and having as herein shown two branches, one of which is connected with the armature $g^9$ and the front stop $g^{10}$ of the relay or magnet $a^{14}$, and the other branch of which is connected to suitable manually operated circuit controllers or push buttons $g^{12}$ $g^{13}$ $g^{14}$. As represented in Fig. 1, the local battery $g^8$ has one pole, as for instance, the positive pole, connected by wire $g^{15}$ to the front stop $g^{10}$, and its negative pole connected by wire $g^{17}$ to one coil of the electro-magnet $g^5$, the other coil of which is connected by wire $g^{18}$ to the armature $g^9$ of the relay $a^{14}$. The circuit controllers $g^{12}$, $g^{13}$, $g^{14}$ have one member connected by branch wires $g^{19}$, $g^{20}$, $g^{21}$ to a wire $g^{22}$, connected to the wire $g^{15}$ leading to the positive pole of the battery $g^8$, and the other members of the circuit controllers $g^{12}$, $g^{13}$, $g^{14}$, are connected by wires $g^{23}$, $g^{24}$, $g^{25}$, to a wire $g^{26}$, connected to the wire $g^{18}$ leading to the negative pole of the battery $g^8$. It will thus be seen that the operation of the electro-magnet $g^5$ is both automatically and positively controlled, it being automatically controlled by the relay or electro-magnet $a^{14}$, and positively controlled by one of the circuit controllers $g^{12}$, $g^{14}$ inclusive. The relay $a^{14}$ is energized by the closing of the circuit of the starting magnet for the signal transmitting mechanism, through one of the armatures of the circuit relays 1 to 4, inclusive, and it will thus be seen that if one of the circuits connected with the vaults should be opened during the time in which the system is under the control of the police, the relay $a^{14}$ will be energized by the closing of the circuit including the starting magnet $a^6$, and will attract its armature $g^9$ and bring it into engagement with the front stop $g^{10}$, thereby closing the circuit of the magnet $g^5$ and local battery $g^8$, and automatically releasing the bolt $g$, permitting it to be shot into its socket by the spring $g^6$ or in any other suitable manner. The local circuit when closed by the armature of the relay $a^{14}$ may be traced as follows: from the positive pole of the battery $g^8$ by wire $g^{15}$, front stop $g^{10}$, armature $g^9$, wire $g^{18}$, magnet $g^5$, wire $g^{17}$, back to the battery.

If it should be desired to quickly lock the door of the "grill" at any time during business hours and from a remote or distant point, one of the circuit controllers $g^{12}$, $g^{13}$, $g^{14}$ may be manually operated, as for instance, the circuit controller $g^{12}$ may be located in the superintendent's office and may be closed at that point to energize the magnet $g^5$. The circuit in this instance may be traced from the positive pole of the battery $g^8$ by wires $g^{15}$, $g^{22}$, branch wire $g^{19}$, through the circuit controller $g^{12}$, branch wire $g^{23}$, wires $g^{26}$, $g^{13}$, through the magnet $g^5$ and thence by wire $g^{17}$ to the negative pole of the battery $g^8$. In practice, it is designed that the manually operated circuit controllers, which may be of any desired number, shall be distributed throughout the bank or other institution at the most convenient and desirable places.

In order that the operation of the sytem to transmit an alarm to the police station may be understood, let it be supposed that the operator has tested the various circuits as above described, and that the wedge $a^{40}$ on the drop $a^{41}$ controlled by the electro-magnet $a^{43}$, is in engagement with the circuit terminals $a^{26}$, $a^{27}$, and that the gang switches are in the positions shown in the drawings. In this instance, let it be supposed that an attempt is made to enter a vault having its door included in the No. 1 circuit, that is, in the circuit of the relays 1 and $1^a$, which vault may be supposed to be the silver vault. As soon as an attempt is made to turn the usual handle of the door, which latter may be supposed to be the north door, the bolt mechanism 168 is removed from engagement with the movable members 60, 61, 62 of the circuit controllers governing the said door, and the latter are immediately removed from their co-operating members 63, 64, 65, thereby causing a break in the circuit of the relay 1, demagnetizing the said relay and permitting its armature 16 to be brought in contact with its back stop 6, thereby closing the circuit of the magnet $a^6$, which circuit may be traced as follows:—from the positive pole of the battery $a^7$ by wire $a^{17}$, terminal $a^{19}$, wire $a^{22}$, terminal $a^{21}$, wire $a^{24}$, wire 10, back stop 6, armature 16, branch wire 20, wire $a^{25}$, to terminal $a^{26}$, through the wedge $a^{40}$ to terminal $a^{27}$, thence by wire $a^{28}$ to members $a^{29}$ $a^{30}$ of the circuit controller A, thence by wire $a^{31}$ to terminal $a^{32}$, thence by the wire $a^{34}$, terminal $a^9$, wire $a^8$, through the magnet $a^6$, wire $a^{12}$, magnet $a^{14}$, wire $a^{15}$, to terminal $a^{16}$, thence by the wire $a^{23}$, terminal $a^{20}$ and wire $a^{18}$, to the negative pole of the battery. As soon as the circuit just described, is completed by the armature 16 of the relay 1, the magnet $a^6$ attracts its armature $a^5$, thereby releasing the motor mechanism of the signal transmitting mechanism. The break-wheel $a$, in the present instance, is represented as provided with raised teeth or projections, and as each tooth on the said wheel comes in contact with the terminal $b$ the circuit of the relay $b^8$ located in the main or steel vault, is opened, as is also the circuit of the bell magnet $b^{47}$ and register magnet $b^{50}$ located in the police station. Each opening of the circuits of the relay $b^3$ and the magnets $b^{47}$ $b^{50}$ is recorded, not only within the police station, but also upon the registers B B' in the main or steel vault and the superintendent's office, and the time at which such message is recorded, is marked upon a strip of paper as indicated in Fig. 11, the receiving apparatus in the police station being also preferably provided with a time stamp mechanism, and not herein shown. The circuit of the relay $b^3$ may be traced as follows, viz:—from the positive pole of the battery $b^8$ by wire $b^9$, terminal $b^7$, wire $b^6$, terminal $b^5$, wire $b^4$, relay $b^3$, wire $b^2$, contact pen $b$, pen $b'$, wire $b^{12}$, wire $b^{13}$, terminal $b^{15}$, switch $b^{17}$, wire $b^{40}$, through the cut-out $b^{41}$, thence by the branches $b^{42}$, $b^{43}$ to the member $b^{44}$ of the key K within the police station, thence by the member $b^{45}$, wire $b^{46}$, bell magnet $b^{47}$, wire $b^{49}$, register magnet $b^{50}$, wire $b^{51}$, to the ground G', thence to the ground at the bank, and by wire $b^{10}$ to the negative pole of the battery. At each opening of the circuit referred to, occasioned by a tooth on the break-wheel $a$, the said opening is sounded upon the bell $b^{48}$ and is recorded upon the strip $b^{52}$ of the police register in a short mark, after the manner indicated on the tape $c^{22}$, Fig. 11. In order that the record at the police station may be made at each opening rather than at each closure of the circuit, the stylus or marking pen $b^{54}$ is mounted on an arm 100 (see Fig. 10) pivoted as at 101 and adapted to be turned on its pivot by the armature $b^{53}$ of the magnet $b^{50}$. The stylus is removed from the recording tape $b^{52}$ at each closure of the circuit by the spring or arm 102, which is secured to the armature $b^{53}$.

Another feature of this invention consists in connecting the different circuits and batteries comprising the system to circuit terminals on a common switch board, whereby different combinations of the circuits may be effected, as for instance, in one order or arrangement, one vault may be included in No. 1 circuit, a second vault in No. 2 circuit, a third vault in No. 3, a fourth vault in No. 4, &c., and in another order or arrangement, the vault previously connected in No. 1 circuit, may be connected with No. 4 circuit, and in another arrangement, two vaults may be included in No. 1 circuit. This combination or arrangement of circuits is illustrated in part in Figs. 5 to 7 inclusive.

In Fig. 5, we have represented the circuit controllers 60 to 65 and 70 to 75 of the silver vault, connected in circuit with the relays 1, $1^a$ of the battery $d^{10}$, and the circuit controllers $h^8$, $h^9$, $h^{10}$ of a different vault, which may be supposed to be the granite vault, as connected in circuit with the relays 4, $4^a$, and a battery $h$. In this arrangement, the No. 1 circuit is the same as that shown in Fig. 1. The No. 4 circuit may be traced as follows, viz:—from the positive pole of the battery $h$ by wire $h'$, terminel $h^2$, wire $h^3$, terminal $h^4$, wire $h^5$, to terminal $h^6$, thence by wire $h^7$, circuit controllers $h^8$, $h^9$, $h^{10}$, the same being supposed to be closed by the bolt work of the vault door, thence by wire $h^{100}$ to terminal $h^{12}$, wire $h^{13}$, terminal $h^{14}$, wire $h^{15}$, relays $4^a$, 4, wire $h^{16}$, to terminal $h^{17}$, thence by wire $h^{18}$, terminal $h^{19}$, wire $h^{20}$, terminal $h^{21}$, and wire $h^{22}$ to the negative pole of the battery.

In Fig. 6, the circuit controllers $h^8$, $h^9$, $h^{10}$ of the granite vault are connected in the No. 1 circuit including the relays 1, $1^a$, and battery $d^{10}$, while the circuit controllers of the silver vault are connected in the No. 4 circuit; and in Fig. 7, the circuit controllers of both vaults are connected in the No. 1 circuit, while the No. 4 circuit is connected directly to the battery $h$ and is practically disconnected from the system. In practice, it might occur that one of the circuit batteries should become run down, and in this emergency, the weakened battery may be disconnected at the switch board and a fresh or auxiliary battery $k$ may be instantly connected with the circuit, which would otherwise be disabled, thereby avoiding loss of time in placing the otherwise disabled circuit in operative condition.

In Fig. 8, we have represented the auxiliary battery $k$ as connected to the No. 4 circuit, when arranged to include the relays 4, $4^a$, and the circuit controllers $h^8$, $h^9$, $h^{10}$, after the manner shown in Fig. 5. In this instance, the positive pole of the battery $k$ is connected by wire $k'$ to the terminal $k^2$, joined by wire $k^3$ to the terminal $h^4$, while the negative pole of the battery $k$ is connected by wire $k^4$ to the terminal $k^5$ joined by wire $k^6$ to the terminal $h^{19}$, the rest of the circuit No. 4 being the same as shown in Fig. 5. As above described, the wires of the system lead to a switch board $a^{10}$ and the arrangement of circuits represented in Figs. 5 to 7 is effected by changing the connections of the different terminals on the switch board. This switch board is preferably located within a suitably locked case, the key of which is in the possession of the superintendent. In order to prevent unauthorized access to the switch board, and thereby prevent short circuiting of the relays governing any particular vault, the said switch board is located within the said case, not herein shown, but which has a suitable lock $m$ (see Fig. 15) the bolt $m'$ of which forms one member of a circuit controller for the switch board case, the other member of the said circuit controller being preferably formed by a spring arm $m^2$, secured to a stationary support $m^3$ which may be a part of the case, the said spring arm having secured to it an arm, rod, or projection $m^4$, with which co-operates a stud or projection $m^5$ on the back of the switch board $a^{10}$, the latter for the best results, being hinged or pivoted to the bottom of its case, and the removable wires by which the different circuit terminals are connected together, being attached to the back of the switch board. By this construction, it will be seen that the switch board must be turned forward in order to gain access to the wires on its back. In the normal position of the switch board the stud $m^5$ acts on the rod $m^4$, and presses the spring arm $m^2$ away from the circuit terminal or member $m'$, thereby opening the circuit in which the controller is placed. The members $m^2$, $m'$, of the switch board circuit controller are connected to the branch wires $a^{44}$ $a^{45}$ connected to the battery $a^7$ through the starting magnet $a^6$ and magnet $a^{14}$, so that if the switch board is turned forward into the position shown in Fig. 15, the spring member $m^2$ will move forward, and engage the terminal $m'$, thereby closing the circuit of the battery $a^7$ and setting the signal-transmitting mechanism in operation, besides operating the lock of the grill. When the switch board $a^{10}$ is in its normal or upright position, the stud $m^5$ strikes the projection $m^4$ and forces the spring arm or terminal $m^2$ away from the terminal $m'$.

To facilitate the description and to enable the electrical connections of the various circuits to be more easily traced, the switch board $a^{10}$ is represented in the drawings by a number of boards, which, in practice, may and preferably will be one board.

We claim—

1. In an electro-protective system for security vaults, banks and like institutions, the combination of the following instrumentalities; viz:—an electric circuit provided with a circuit controller located at the vault or safe to be protected, a relay in said circuit, a second electric circuit including the starting or operating magnet of a signal-transmitting mechanism and a time operated circuit controller, and a third electric circuit including a message receiving or recording instrument, under the control of the said signal-transmitting mechanism, whereby the operation of the first mentioned circuit during a predetermined interval of time causes a signal indicated by the signal-transmitting mechanism to be transmitted over the third mentioned circuit and to be received upon the receiving instrument included in the said third circuit, substantially as described.

2. In an electro-protective system for security vaults, banks and like institutions, the combination of the following instrumentalities; viz:—an electric circuit provided with a circuit controller located at the vault or safe to be protected, a relay in said circuit, a second electric circuit including the starting or operating magnet of a signal transmitting mechanism and a time operated circuit controller, and a third electric circuit including a message receiving or recording instrument under the control of the said signal transmitting mechanism, a relay in said third circuit, a local circuit controlled by said relay, and a message receiving instrument in said local circuit, substantially as described.

3. In an electro-protective system for security vaults, banks and like institutions, the combination of the following instrumentalities; viz:—an electric circuit, a signal receiving instrument included therein, a signal transmitting mechanism to operate said circuit and transmit a predetermined signal to the said receiving instrument, a relay in said circuit, a local circuit controlled by said relay, a message recording instrument in said local circuit under control of the said relay, a branch for said local circuit provided with a circuit controller adapted to operate the said recording instrument independent of the said relay, substantially as described.

4. In an electro-protective system for security vaults, banks and like institutions, the combination of the following instrumentalities; viz:—an electric circuit, a signal receiving instrument included therein, a signal transmitting mechanism to operate said circuit and transmit a predetermined signal to the said receiving instrument, a relay in said circuit, a local circuit controlled by said relay, a message recording instrument in said local circuit under control of the said relay, a branch for said local circuit, a plurality of distinguishable circuit controllers included in said branch and each adapted to operate the said recording instrument independent of the said relay and independent of each other, whereby the particular circuit controller operated may be identified on the recording instrument, substantially as described.

5. In an electro-protective system for security vaults, banks and like institutions, the combination of the following instrumentalities; viz:—an electric circuit, a signal receiving instrument included therein, a signal transmitting mechanism to operate said circuit and transmit a predetermined signal to the said receiving instrument, a relay in said circuit, a local circuit controlled by said relay, a message recording instrument in said local circuit under control of the said relay, a time indicating mechanism controlled by the said recording instrument, a branch for said local circuit, a plurality of distinguishable circuit controllers included in said branch and each adapted to operate the said recording instrument independent of the said relay and independent of each other, whereby the particular circuit controller operated may be identified on the recording instrument, substantially as described.

6. In an electro-protective system for security vaults, banks and like institutions, the combination of the following instrumentalities; viz:—an electric circuit, a signal receiving instrument included therein, a signal transmitting mechanism to operate said circuit and transmit a predetermined signal to the said receiving instrument, a relay in said circuit, a local circuit controlled by said relay, a message recording instrument in said local circuit under control of the said relay, a switch or circuit controller in the circuit of the said relay, a battery normally disconnected from the relay circuit including the signal receiving instrument, but under the control of the said switch, whereby the said battery may be connected in circuit with the said relay and the receiving instrument disconnected from the relay circuit, substantially as and for the purpose specified.

7. In an electro-protective system for security vaults, banks and like institutions, the combination of the following instrumentalities; viz:—an electric circuit provided with a circuit controller located at the vault or safe to be protected, a relay in said circuit, a second electric circuit including the starting or operating magnet of a signal transmitting mechanism and a time operated circuit controller, and a third electric circuit including a message receiving or recording instrument under the control of the said signal transmitting mechanism, a branch circuit for the said second circuit, a circuit controller in said branch circuit, whereby the said starting magnet may be energized independent of the relays in the first circuit to transmit a signal to the receiving station, substantially as described.

8. In an electro-protective system for security vaults, banks, and like institutions, the combination of the following instrumentalities; viz:—an electric circuit, provided with a circuit controller located at the vault or safe to be protected, a relay in said circuit, a second electric circuit, a relay $a^{14}$ in said second circuit, a local circuit controlled by the relay $a^{14}$, a lock controlling magnet in said local circuit, substantially as described.

9. In an electro-protective system for security vaults, banks and like institutions, the combination of the following instrumentalities; viz:—an electric circuit provided with a circuit controller located at the vault or safe to be protected, a relay in said circuit, a second electric circuit, a relay $a^{14}$ in said second circuit, a local circuit controlled by the relay $a^{14}$, a lock controlling magnet in said local circuit, a branch for said local circuit and a circuit controller in said branch to operate the said lock magnet independent of the relay $a^{14}$, substantially as described.

10. In an electro-protective system for security vaults, banks and like institutions, the combination of the following instrumentalities; viz:—an electric circuit provided with a normally closed circuit controller located at the vault or safe to be protected, a relay in said circuit, an auxiliary battery, and a switch normally disconnecting said auxiliary battery from the relay circuit while the latter remains closed at the said circuit controller, but adapted to connect the said auxiliary battery to the relay when the said circuit controller is open, substantially as and for the purpose specified.

11. In an electro-protective system for security vaults, banks and like institutions, the combination of the following instrumentalities; viz:—an electric circuit provided with a signal controlling relay, and with a test relay, a test circuit controlled by said test relay, an electro-magnet in said test circuit, and a circuit controller for said test circuit, substantially as described.

12. In an electro-protective system for security vaults, banks and like institutions, the combination of the following instrumentalities; viz:—an electric circuit provided with a signal controlling relay, and with a test relay, a test circuit controlled by said test relay, an electro-magnet in said test circuit, an electric circuit controlled by said test magnet and including a circuit controlling magnet $a^{43}$, and an electric circuit controlled by the electro-magnet $a^{43}$, substantially as described.

13. In an electro-protective system for security vaults, banks and like institutions, the combination of the following instrumentalities; viz:—an electric circuit provided with a signal controlling relay, and with a test relay, a test circuit controlled by said test relay, an electro-magnet in said test circuit, a circuit controller for said test circuit, an "out of order" electric circuit, a circuit controller governed by the test magnet to normally close said "out of order" circuit at one point, an electro-magnet in said "out of order" circuit, and a normally open circuit controller for said "out of order" circuit, substantially as described.

14. In an electro-protective system, for security vaults, banks and like institutions, the combination of the following instrumentalities; viz:—an electric circuit provided with a signal controlling relay, and with a test relay, a test circuit controlled by said test relay, an electro-magnet in said test circuit, a circuit controller for said test circuit, an "out of order" electric circuit, a circuit controller governed by the test magnet to normally close said "out of order" circuit at one point, an electro-magnet in said "out of order" circuit, and a normally open circuit controller for said "out of order" circuit, and an alarm circuit controlled by the electro-magnet in the said "out of order" circuit, substantially as described.

15. In an electro-protective system for security vaults, banks and like institutions, the combination of the following instrumentalities; viz:—a series of electric circuits each provided with a signal controlling relay and with a test relay, electro-magnets $1^b$, $2^b$, &c., in said test circuits, an "in order" electric circuit provided with circuit terminals under the control of the said electro-magnets, electro-magnets $1^c$, $2^c$, &c., also in said test circuits, circuit terminals in the said "in order" circuit under the control of the electro-magnets $1^c$, $2^c$, &c., circuit controllers for said test circuits, a circuit controller for said "in order" circuit, and an electro-magnet $e^{14}$ in said "in order" circuit, substantially as described.

16. In an electro-protective system for security vaults, banks and like institutions, the combination of the following instrumentalities; viz:—a series of electric circuits each provided with a signal controlling relay and with a test relay, electro-magnets $1^b$, $2^b$, &c., in said test circuits, an "in order" electric circuit provided with circuit terminals under the control of the said electro-magnets, electro-magnets $1^c$, $2^c$, &c., also in said test circuits, circuit terminals in the said "in order" circuit under the control of the electro-magnets $1^c$, $2^c$, &c., circuit controllers for said test circuits, a circuit controller for said "in order" circuit, an electro-magnet $e^{14}$ in said "in order" circuit, an electro-magnet $a^{43}$ in said "in order" circuit, and an electric circuit controlled by the magnet $a^{43}$, substantially as described.

17. In an electro-protective system for security vaults, banks and like institutions, the combination of the following instrumentalities; viz:—a series of electric circuits each provided with a signal controlling relay and with a test relay, electro-magnets $1^b$, $2^b$, &c., in said test circuits, an "in order" electric circuit provided with circuit terminals under the control of the said electro-magnets, electro-magnets $1^c$, $2^c$, &c., also in said test circuits, circuit terminals in the said "in order" circuit under the control of the electro-magnets $1^c$, $2^c$, &c., circuit controllers for said test circuits, an "out of order" electric circuit, a series of circuit terminals in said "out of order" circuit corresponding to the test circuits and connected in parallel, a circuit controller for both the "in order" and "out of order" circuits, an electro-magnet $e^{13}$ in the "out of order" circuit, and an audible alarm controlled by the electro-magnet $e^{13}$, substantially as described.

18. In an electro-protective system for security vaults, banks and like institutions, the combination of the following instrumentalities; viz:—a series of electric circuits each provided with a relay, a switch board provided with circuit terminals to which the relays are connected, a series of branches or loops provided with circuit controllers, circuit terminals on the said switch board to which the said loops are connected, and changeable connections joining the loop terminals to the relay terminals, whereby the said loops or branches containing the circuit controllers may be connected or arranged in different circuits, substantially as described.

19. In an electro-protective system, the combination of the following instrumentalities; viz:—an electric circuit provided with a circuit controller located at the vault or safe to be protected, a relay in said circuit, a second electric circuit including the starting or operating magnet of a signal-transmitting mechanism and a time operated circuit controller, and a third electric circuit including a message receiving or recording instrument, under the control of the said signal-transmitting mechanism, whereby the operation of the first mentioned circuit during a predetermined interval of time causes a signal indicated by the signal-transmitting mechanism to be transmitted over the third mentioned circuit and to be received upon the receiving instrument included in the said third circuit, substantially as described.

In testimony whereof we have signed our names to this specification in the presence of two subscribing witnesses.

FREDERIC G. STOREY.
EDWARD R. ANDREWS.
JOHN P. CUSHING.
HOWARD F. EATON.

Witnesses:
JAS. H. CHURCHILL,
J. MURPHY.